(12) United States Patent
Holzberger et al.

(10) Patent No.: US 11,199,249 B2
(45) Date of Patent: Dec. 14, 2021

(54) ACTUATOR OF AN APPARATUS FOR LEVEL ADJUSTMENT OF A MOTOR VEHICLE

(71) Applicant: Schaeffler Technologies AG & Co. KG, Herzogenaurach (DE)

(72) Inventors: Markus Holzberger, Emskirchen (DE); Tim Bartling, Aachen (DE); Sebastian Sommerkorn, Weisendorf (DE); Hartmut Krehmer, Erlangen (DE); Wilfried Breton, Altdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 218 days.

(21) Appl. No.: 16/485,478

(22) PCT Filed: Feb. 1, 2018

(86) PCT No.: PCT/DE2018/100081
§ 371 (c)(1),
(2) Date: Aug. 13, 2019

(87) PCT Pub. No.: WO2018/149441
PCT Pub. Date: Aug. 23, 2018

(65) Prior Publication Data
US 2020/0003287 A1  Jan. 2, 2020

(30) Foreign Application Priority Data

Feb. 20, 2017  (DE) .................... 10 2017 001 568.6
Apr. 28, 2017  (DE) .................... 10 2017 109 147.5

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/24* | (2006.01) |
| *B60G 17/015* | (2006.01) |
| *F16H 25/22* | (2006.01) |
| *F16H 25/20* | (2006.01) |

(52) U.S. Cl.
CPC ....... *F16H 25/2454* (2013.01); *B60G 17/015* (2013.01); *B60G 2202/42* (2013.01);
(Continued)

(58) Field of Classification Search
CPC .......... F16H 25/2454; F16H 2019/008; F16H 25/2015; F16H 25/2025; F16H 2035/006
(Continued)

(56) References Cited

U.S. PATENT DOCUMENTS 2,854,113 A * 9/1958 Hallden .................. H02K 7/06
  192/141
4,747,319 A * 5/1988 Sakuta .................. B62D 33/07
  74/411.5
(Continued)

FOREIGN PATENT DOCUMENTS

DE            3904      4/1878
DE    102009016252 A1  10/2010
(Continued)

*Primary Examiner* — Jake Cook
(74) *Attorney, Agent, or Firm* — Reid Baldwin (57) ABSTRACT

An actuator for level adjustment of a motor vehicle utilizes a ball screw and a locking unit provided for blocking the ball screw. The actuator has a spindle drive which can be actuated by an electric motor via a gear. The spindle may be fastened to a damper of the chassis of a motor vehicle, to a wheel carrier or to the body or a subframe of a motor vehicle. With the aid of a locking unit of the spindle drive, the rotation of the spindle nut can be optionally blocked or enabled. The locking unit includes a locking element which engages a locking contour attached to the end face of a rotatable element of the gear.

16 Claims, 7 Drawing Sheets

(52) U.S. Cl.
CPC .. *B60G 2202/442* (2013.01); *B60G 2204/419* (2013.01); *B60G 2204/423* (2013.01); *B60G 2204/4604* (2013.01); *B60G 2500/30* (2013.01); *F16H 25/2204* (2013.01); *F16H 2025/2081* (2013.01)

(58) Field of Classification Search
USPC .............................................. 74/89.37, 89.39
See application file for complete search history.

(56) References Cited

U.S. PATENT DOCUMENTS 8,516,914 B2 * 8/2013 Osterlanger ........... B62D 17/00
74/89.39
9,694,643 B2 * 7/2017 Mersmann ......... B60G 17/0157

FOREIGN PATENT DOCUMENTS

| | | |
|---|---|---|
| DE | 102014206142 A1 | 2/2015 |
| DE | 102013222648 A1 | 5/2015 |
| DE | 102015206149 A1 | 10/2015 |
| DE | 102014213121 A1 | 1/2016 |
| DE | 102006018264 B4 | 2/2016 |
| DE | 102015214161 A1 | 2/2017 |
| EP | 1630119 A1 | 3/2006 |
| EP | 2236324 A2 | 10/2010 |
| EP | 2657129 A2 | 10/2013 |
| FR | 2591701 A1 | 6/1987 |
| WO | 2015021952 A1 | 2/2015 |

* cited by examiner

ACTUATOR OF AN APPARATUS FOR LEVEL ADJUSTMENT OF A MOTOR VEHICLE

CROSS-REFERENCE TO RELATED APPLICATIONS

This application is the U.S. National Phase of PCT Appln. No. PCT/DE2018/100081 filed Feb. 1, 2018, which claims priority to DE 10 2017 001 568.6 filed Feb. 20, 2017 and DE 10 2017 109 147.5 filed Apr. 28, 2017, the entire disclosures of which are incorporated by reference herein.

TECHNICAL FIELD

The disclosure relates to an actuator provided for level adjustment of a motor vehicle, which comprises an electrically actuated spindle drive, in particular in the form of a ball screw, wherein the spindle nut of the spindle drive is rotatably mounted and can be blocked by a locking unit.

BACKGROUND

DE 10 2015 206 149 B4 discloses a device for level adjustment of a vehicle body, which operates with a screw drive and has a latching device which bridges the screw drive with form fit in at least two axial positions. The latching device operates according to the so-called ballpoint pen principle and has latching stops which are arranged at different axial positions and cooperate with control cams. A latching sleeve of the latching device is formed by a stack of sleeve rings arranged in axial succession along the spindle axis. Spacers are arranged between the individual sleeve rings.

Further devices for level adjustment of a vehicle body which comprise latching devices which bridge a ball screw are disclosed, for example, in documents DE 10 2014 206 142 A1 and WO 2015/021952 A1.

A device for level adjustment for a motor vehicle, which is known from DE 10 2015 214 161 A1, comprises a damper device having a piston-cylinder unit and a screw drive with a spindle and a nut which is mounted on this spindle via rolling bodies and to which a spring seat of the damper device is coupled, wherein the nut is axially movable along the spindle. An adapter sleeve is inserted into the spindle, i.e. threaded spindle, which adapter sleeve supports the spindle axially and has a radially inwardly directed flange which is supported on the piston-cylinder unit. The adapter sleeve is acoustically uncoupled from the cylinder of the piston-cylinder unit with the aid of an elastic element.

A further active wheel suspension element which operates with a ball screw is known for example from DE 10 2013 222 648 A1. In this case, a spring holder, on which both a chassis spring and a compensation spring are supported, is coupled to an axially displaceable nut of a ball screw.

A chassis actuator with a Geneva mechanism is known from DE 10 2014 213 121 A1. The Geneva mechanism comprises a driving wheel which has a peg and a locking disk. A star wheel cooperates with the driving wheel, which star wheel has slots for the peg and contours which have a complementary form to the locking disk.

EP 2 657 129 A2 discloses an actuator for a landing gear of an aircraft. This actuator comprises a screw drive and an electric latching mechanism with a plurality of detent elements.

SUMMARY

The disclosure relates to an actuator for level adjustment, in particular level regulation, of a motor vehicle, which operates with a ball screw and comprises a locking unit provided for blocking said ball screw, which locking unit is notable both for a compact construction and the option of fine gradation.

The actuator has a spindle drive which can be actuated by an electric motor via a gear, wherein the spindle nut of said spindle drive is coupled via an axial bearing to a housing, which is not necessarily closed and is slideable relative to the spindle of the spindle drive in a manner secured against twisting. The spindle is fastened for example to a damper of the chassis of a motor vehicle, to a wheel carrier or to the body or a subframe of a motor vehicle. In this case, the spindle is a non-revolving part of the spindle drive, in particular ball screw. With the aid of a locking unit of the spindle drive, the rotation of the spindle nut can be optionally blocked or enabled. This procedure of optionally activating and deactivating the locking unit can be realized solely by the actuation of the electric motor. The locking unit comprises a locking contour, which is attached to the end face of a rotatable element of the gear provided for actuation of the spindle drive. The locking unit further comprises a locking element which is movable relative to the said housing and engages in the revolving locking contour in the axial direction of the spindle drive.

The engagement of the locking element in the locking contour in the axial direction of the spindle drive means that at least one portion of the locking element is aligned parallel to the longitudinal axis of the spindle drive, for example in the form of a peg-shaped end piece of the locking element which is directed towards the locking contour, wherein this can also be a short, disk-shaped or conical end piece or an end piece which is profiled in another manner. Moreover, in typical configurations, the locking element does not extend in the longitudinal direction of the spindle drive. Instead, the locking element, where this refers to an elongated element such as a lever or a slide, preferably extends in a direction which encloses a right angle with the direction in which the portion cooperating directly with the locking contour is aligned. In the case of a mostly flat configuration of the locking element, the longitudinal axis of the spindle drive preferably represents a surface normal of the surface in which most of the locking element lies. The locking element in this case lies predominantly in a plane which is parallel to the locking contour and is displaceable in this plane, i.e. slideable or pivotable, wherein a portion of the locking element also engages in the locking contour in the axial direction in this case.

Irrespective of the geometry and the manner in which the locking element is movable, this locking element is preferably loaded within the locking unit by holding forces which can only be overcome by a pivoting movement of the locking contour. In particular, the holding forces can include friction forces, wherein optionally separate elements, for example at least one spring element, set the friction forces in a defined manner. It is likewise possible, for example, to generate friction forces on a pivot axis of the locking element with the aid of a friction bushing, which friction forces act on the locking element.

The friction forces ensure in any case that the locking element maintains its current position so long as it is not forced out of this position by a twisting of the locking contour lying substantially in a plane. The locking contour, which is located on the end face of a revolving gear element preferably comprises a plurality of cam tracks, wherein that portion of the locking element which is constructed for example as a peg or pin and engages in the locking contour can optionally be guided in one of a plurality of cam tracks to enable or block an adjustment of the spindle drive. Switching between different cam tracks is possible by reversing the direction of revolution of the locking contour attached to the gear element, which means reversing the direction of revolution of the electric motor, at defined switching points.

According to one possible design, the locking element is configured as a locking lever which can be deflected about a pivot axis and cooperates with the locking contour. The pivot axis of the locking lever here is aligned parallel to the center axis of the spindle drive, wherein the locking lever, as in other configurations, engages in the locking contour in the axial direction of the spindle drive. Owing to the substantially flat arrangement of the locking contour, an extremely compact construction of the locking unit can be realized, particularly in the axial direction of the spindle drive.

The element having the locking contour is capable of revolving about an axis which is arranged parallel to the longitudinal axis of the spindle drive. In particular, the rotational axis of the element supporting the locking contour can coincide with the rotational axis of a further rotatable element, for example the spindle nut or the rotor of the electric motor. Directly forming the locking contour by means of the spindle nut is also possible. In an extreme case, the spindle drive has a single rotational axis, which refers both to the rotational axis of the electric motor and the rotational axis of the spindle nut and the element having the locking contour. The pivot axis of the locking lever is preferably spaced from the rotational axis of the spindle to the extent that it does not intersect the spindle nut.

The electrically driven spindle nut is displaced together with the housing in the axial direction relative to the spindle, i.e. threaded spindle. In a simplified configuration, the spindle drive can operate without rolling bodies, i.e. it can be formed as a simple movement thread. The axial bearing which is required in any case for mounting the spindle nut in the housing is preferably formed as an axial self-aligning bearing, in particular an axial self-aligning needle bearing. For the technological background, please refer to documents DE 10 2006 018 264 B4, EP 1 630 119 A1 and DE 000 R 0013 904 MAZ in this connection.

In a preferred configuration, the spindle nut is driven via a spur gear, in particular a multi-stage spur gear with a high overall multiplication factor. Instead of an axial bearing formed as a rolling bearing, it is, in principle, also possible to use a slide bearing for mounting the spindle nut in the housing, wherein the bearing is preferably also formed in the manner of a self-aligning bearing in this case, whereby stresses within the spindle drive are efficiently counteracted in all operating states of the motor vehicle.

The substantially flat, disk-shaped locking contour can be configured in such a way that only a single latching position is provided along the circumference. Such a configuration is possible in particular when the element having the locking contour rotates more quickly than the spindle nut, i.e. is coupled in a torque-proof manner in the form of a separate locking disk to a gear element connected upstream of the spindle nut or is formed directly by such a gear element. On the other hand, in the case of a slower rotation of the locking disk or a gear element which directly assumes the function of a locking disk, in particular in the case of a torque-proof coupling of the locking disk to the spindle nut, it is particularly advantageous within the context of a fine gradation of the locking unit to provide a plurality of latching positions along the circumference of the locking disk.

In a preferred configuration of the locking unit, the pivotable locking lever is loaded by a spring force in the axial direction, i.e. in the longitudinal direction of the pivot axis. The spring force represents a prestressing force which holds the locking lever in its current angular position as long as greater forces are not in effect. A suitable spring for generating the prestressing force is, for example, a plate spring or an annular corrugated washer. The generation of a defined tightening torque by a screw connection without a separate spring element is, in principle, suitable for generating a defined prestressing force which loads the locking lever in the axial direction of the pivot axis.

A friction torque acting on the locking lever can be generated by any manner of loading by a spring force, which friction torque is, on the one hand, smaller than the positioning torque which can be introduced into the locking lever by the cooperation between the locking disk and the locking lever but, on the other, greater than the sum of all the other torques acting on the locking lever, including torques generated in particular by mass inertia during positioning movements.

When the locking element is designed as a slideable element, the mobility of this element can also be specifically hindered by a separate device, for example by a brake, in a simple configuration in the form of a spring contacting the linearly movable locking element.

The locking lever or other locking element can be prevented from lifting off the locking disk in different ways. In this regard, it is, for example, possible that the locking lever is coupled to contours of the locking disk in the manner of an undercut by its end cooperating with the locking disk, which engages in the locking disk in the axial direction. It is likewise possible to mount a cover upstream of the locking lever in the axial direction of the spindle drive, which cover is integrated in the spindle drive in a manner fixed to the housing, or is formed directly by the housing and prevents the locking lever from lifting off the locking disk. These design options can be realized irrespective of whether the locking contour is provided by a separate locking disk coupled to a gear element or is integrated in a toothed element of the gear via which the electric motor drives the spindle nut.

In a preferred embodiment, the locking contour formed on an end face of the locking disk or directly on the end face of a toothed wheel describes two annularly closed running contours and a latching contour. The two running contours here have at least one common portion, whilst the latching contour has at least one point in common with at least one of the running contours. This produces at least three switching points in total, which enable switching between the running contours and the latching contour. The first running contour corresponds to a rotation of the spindle nut in a first direction of rotation; the second running contour corresponds to the rotation of the spindle nut in the opposite direction. The latching positions are then only approached when the locking disk revolves in a certain direction. This direction of revolution is produced when the vehicle level is lowered.

In a particularly preferred configuration, the locking disk is connected in a torque-proof manner to an intermediate wheel which is connected as part of a multi-stage gear between the electric motor and the spindle nut. The intermediate wheel, and, with this, the locking disk which is optionally formed directly by the intermediate wheel, rotates at a rotational speed which is lower than the rotational speed of the electric motor but greater than the rotational speed of the spindle nut. On the one hand, this concept means moderate holding torques which are to be absorbed by the locking disk and, on the other, a fine gradation of the locking unit compared to a locking mechanism acting directly on the spindle nut.

With the aid of the intermediate wheel, which supports the locking contour, parallel kinematics of the locking mechanism, i.e. the locking unit, are produced. This means that the locking and unlocking movements are executed parallel to the driving movement and are not located in the load path. A very smooth approach, i.e. deactivation of the locking unit, and departure, i.e. activation of the locking unit, is therefore possible. In the locked state of the locking unit, the region of the gear between the locking unit and the electric motor is load-free.

In the case in which the multi-stage gear is designed as a spur gear, the rotational axes of the spindle nut, intermediate wheel and electric motor are aligned normally to a plane in which the locking lever is pivotable or the locking element is slideable. An imaginary surface can be cut from a plane which lies parallel to this plane and intersects the spindle nut and the intermediate wheel, which surface is delimited by the spindle nut, by the intermediate wheel and by a tangent placed at the spindle nut and at the intermediate wheel.

In this case, the term spindle nut includes a toothed wheel which is connected to the portion of the spindle nut which cooperates with the threaded spindle via rolling bodies or is integrally formed on this portion. The said imaginary surface is delimited by two approximately arcuate lines and a straight line, wherein the approximately arcuate lines each represent toothed contours. In a particularly space-saving design of the actuator, the pivot axis of the locking lever intersects this surface, wherein parts of the locking lever mounted in the housing can project over the said surface. Like the spindle nut, the intermediate wheel is also mounted in the housing of the actuator.

BRIEF DESCRIPTION OF THE DRAWINGS

A plurality of exemplary embodiments are explained in more detail below, with reference to drawings which show.

DETAILED DESCRIPTION

An actuator which is denoted as a whole by the reference sign 1 serves for electromechanical level adjustment and level regulation in a motor vehicle. Here, the actuator 1 of the type illustrated in FIGS. 1 to 3 can be present either on each wheel of an axle or only once for each axle. In both cases, a system travel of 150 mm can be realized with the actuator 1. The actuator 1 comprises a spindle drive 2, which is formed as a ball screw. The spindle nut (denoted by 3) of the spindle drive 2 represents its rotatable component and is displaceable in the linear direction relative to a threaded spindle 4, also referred to as spindle for short. The spindle nut 3 is rotatably mounted in a housing 6 of the actuator 1 by means of an axial bearing 5, namely an axial self-aligning bearing. A spring seat 7, amongst other things, is formed by the housing 6, on which spring seat a chassis spring (not illustrated) formed as a helical spring is supported. The chassis spring introduces forces into the spindle 4 via the spring seat 7, the axial bearing 5 and the spindle nut 3.

Figure 1:
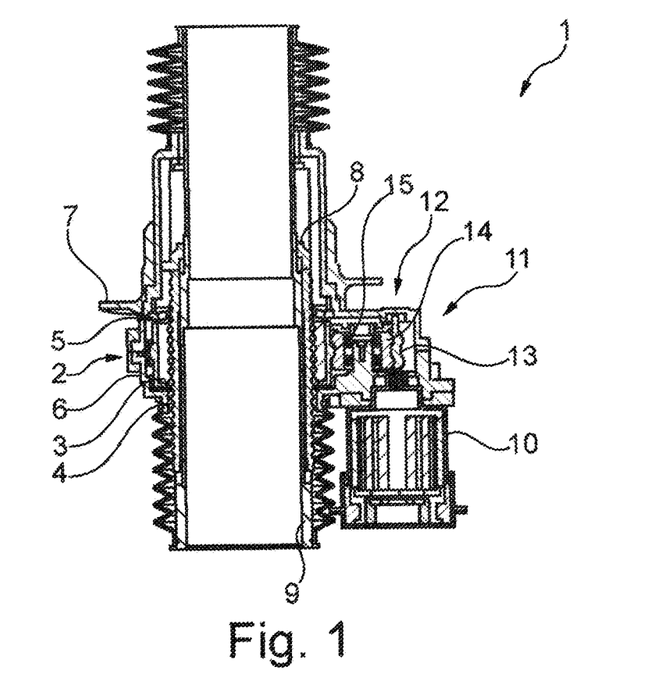
FIG. 1 an actuator of a level adjustment device for a motor vehicle in a sectional illustration, FIG. 2 the actuator in a side view, FIG. 3 the actuator in a perspective illustration, FIGS. 4 and 5 details of the actuator according to FIG. 1, FIGS. 6 to 8 different variants of a locking lever for the actuator according to FIG. 1, FIGS. 9 and 10 details of a locking unit of the actuator according to FIG. 1, FIGS. 11 to 14 in simplified illustrations, different operating states of a locking unit of the actuator, FIG. 15 in a schematic illustration, the arrangement of different elements of the locking unit of the actuator, FIG. 16 in a schematic illustration, the mounting of a spindle nut of the actuator by means of an axial self-aligning bearing, FIG. 17 in an illustration analogous to FIG. 11, an alternative configuration of a locking unit of an actuator of a level adjustment device.
Figure 2:
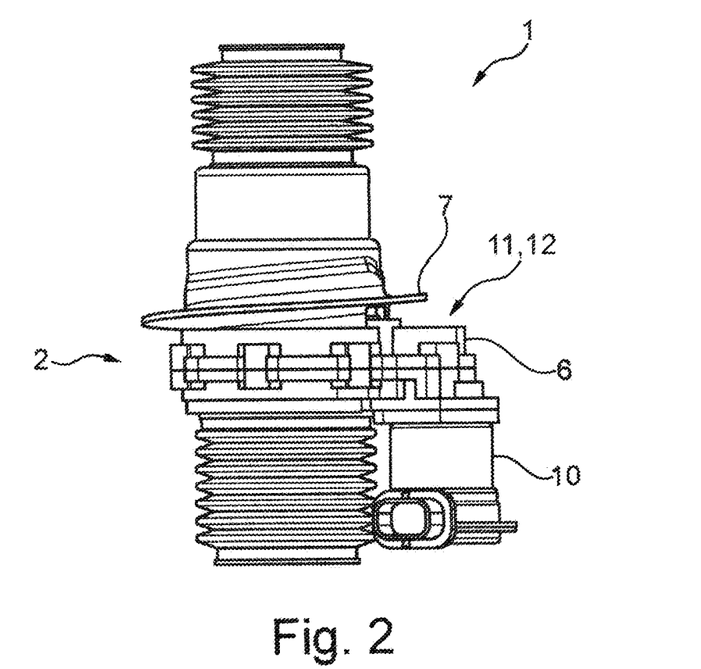
Figure 3:
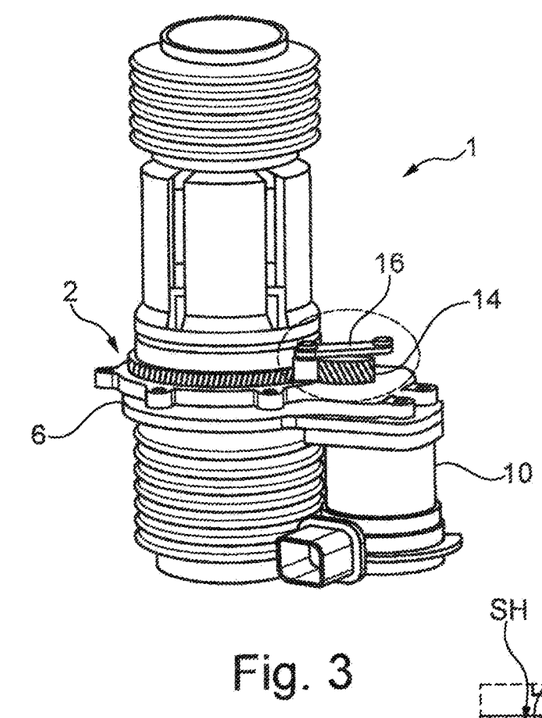
Figure 4:
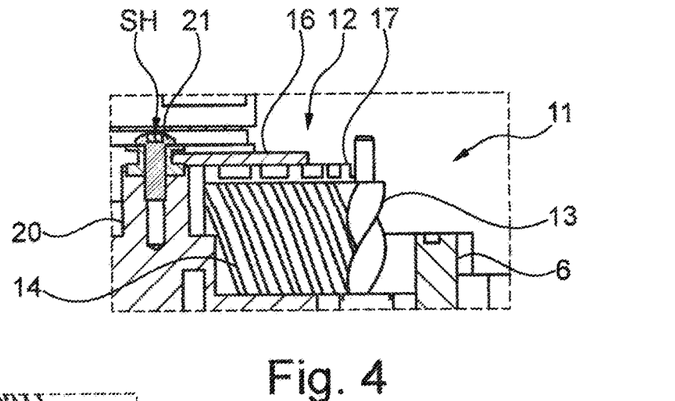

The housing 6 is secured against twisting relative to the spindle 4 with the aid of an anti-twist device 8. 9 denotes a vehicle adapter for fastening the spindle 4 to the vehicle. The spindle 4 is a non-revolving component of the chassis.

To actuate the spindle drive 2, an electric motor 10 is provided which drives the spindle nut 3 via a multi-stage gear 11, namely a spur gear. A locking unit 12, which will be discussed in more detail below, is assigned to the gear 11.

The gear 11 comprises a driving toothed wheel 13, formed as an evoloid, which is fixedly connected to the motor shaft of the electric motor 10. The evoloid 13 introduces a torque into a helically toothed intermediate wheel 14. From this intermediate wheel 14, driving power of the electric motor 10 is transmitted to a main wheel 15 which is arranged concentrically to a portion of the spindle nut 3 which provides a helical running track for the rolling bodies, i.e. balls, of the spindle drive 2. The main wheel 15 of the gear 11, i.e. the driven toothed wheel of the gear 11, is assigned to the spindle nut 3.

The locking unit 12 comprises a locking lever 16, generally referred to as a locking element, and a locking disk 17 which cooperates therewith and is fixedly connected to the intermediate wheel 14. In FIG. 3, components surrounding the locking lever 16 are not shown for the sake of clarity.

The locking disk 17, which is also referred to as a control disk, has, on its end face, a locking contour 18, generally also referred to as a control contour, in which the locking lever 16 engages by means of an end piece 19, which is either integrally formed on the locking lever 16 or connected to the deflectable end thereof.

SH denotes the pivot axis of the locking lever 16. The pivot axis SH is located in the region of a journal 20, which is formed by the housing 6. A screw 21 penetrating the locking lever 16 is screwed into the journal 20 in such a way that the locking lever 16 is loaded by a prestressing force in the axial direction of the pivot axis SH. As a result of this prestressing force, a friction torque RM is generated which is significant in terms of the locking function of the locking lever 16 in conjunction with the locking disk 17.

Figure 6:
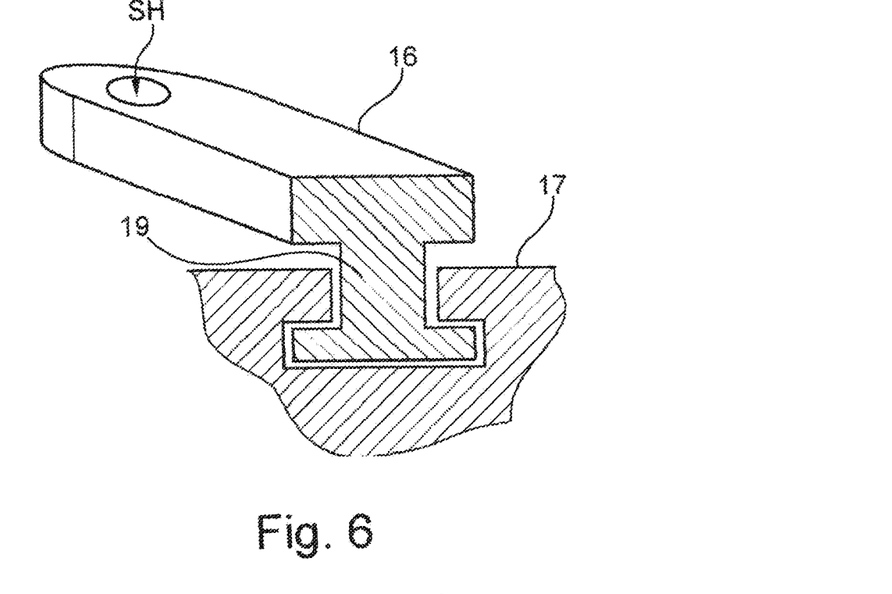
Figure 7:
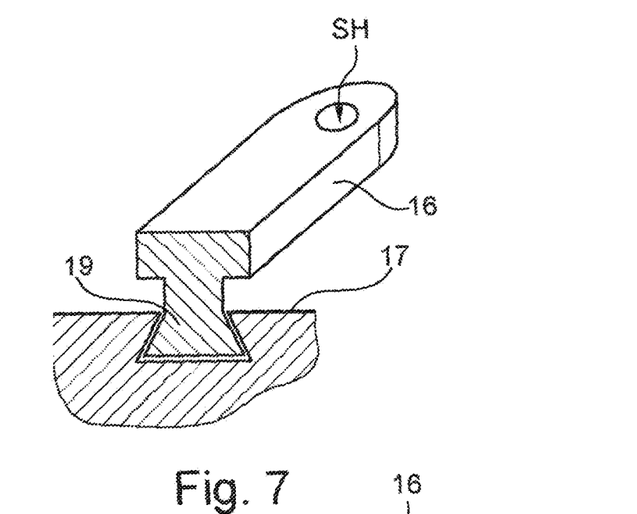
Figure 8:
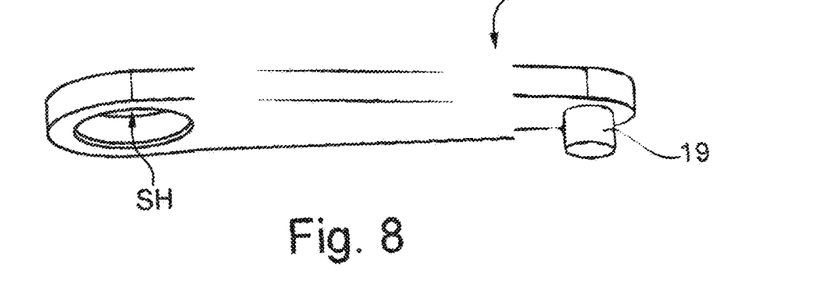
Figure 9:
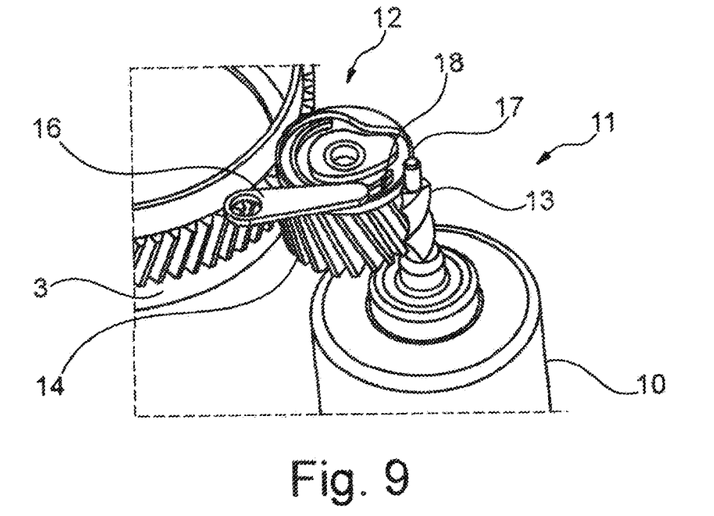
Figure 10:
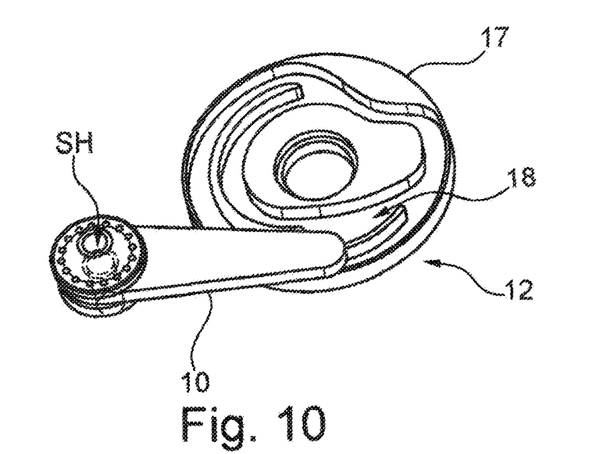

Different possible variants of the end piece 19 which are each suitable for the device according to FIG. 1 are indicated in FIGS. 6 to 8. Whilst, in the variants according to FIGS. 6 and 7, the end piece 19 engages in the locking disk 17 in the form of an undercut, there is no such undercut in the variant according to FIG. 8. The undercut can describe a T shape (FIG. 6) or a V shape (FIG. 7). The locking lever 16 is thus prevented from lifting out of the locking contour 18 in both cases. In the case of FIG. 8, a lifting of the locking lever 16 off the locking disk 17 is prevented by a portion (not illustrated here) of the housing 6, which is arranged at a slight spacing from the locking lever 16.

The cooperation of the locking lever 16 with the locking contour 18 is revealed in particular in FIGS. 9 to 14. The locking contour 18 comprises different portions 22, 23, 24, namely two running contours 22, 23 which are annularly closed in each case, and a locking contour 24. The outer running contour 22 is active when, with reference to the arrangement according to FIGS. 11 to 13, the locking disk 17 revolves counterclockwise. On the other hand, the inner running contour 23 is active upon a rotation of the locking contour 18 in the clockwise direction.

Within each running contour 22, 23, there are various portions within which the end piece 19 of the locking lever 16 is guided either along the inner or along the outer edge of the respective contour. U1, U2 indicate switching points, which enable switching between the different running contours 22, 23. The guidance of the end piece 19 from the inner side of one running contour 22, 23 to the outer side of the other running contour 23, 22, or vice versa, changes at the switching points U1, U2.

A significant factor for the pivoting movement of the locking lever 16 by means of the locking contour 18 is the radius ratio, which changes a plurality of times along each running contour 22, 23. The radius ratio relates to a current radius of a track on which the end piece 19 is moved in relation to the rotating locking disk 17 and is defined as the ratio of the current actual position of the end piece 19 with respect to the next possible position upon a further revolution of the locking disk 17.

If the radius ratio is smaller than one, this means that the end piece 19 abuts against the inner track of the respective running contour 22, 23 and the locking lever 16 is deflected outwards. Conversely, with a radius ratio which is greater than one, the locking lever 16 is deflected inwards from the outer track of the respective running contour 22, 23. During these pivoting procedures, a positioning torque MSt is applied to the locking lever 16, which is greater than the friction torque RM in all cases. If the radius ratio is exactly one, the angular position of the locking lever 16 remains unaltered, wherein, in this case, the friction torque RM prevents undesired positioning movements.

Figure 13:
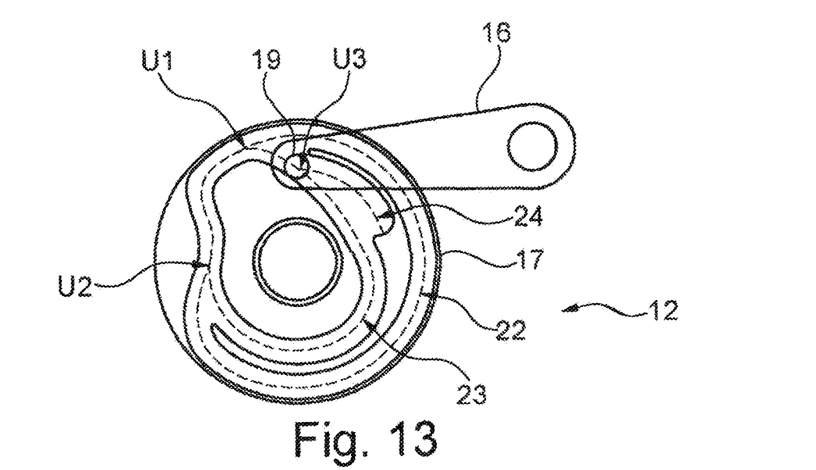
Figure 14:
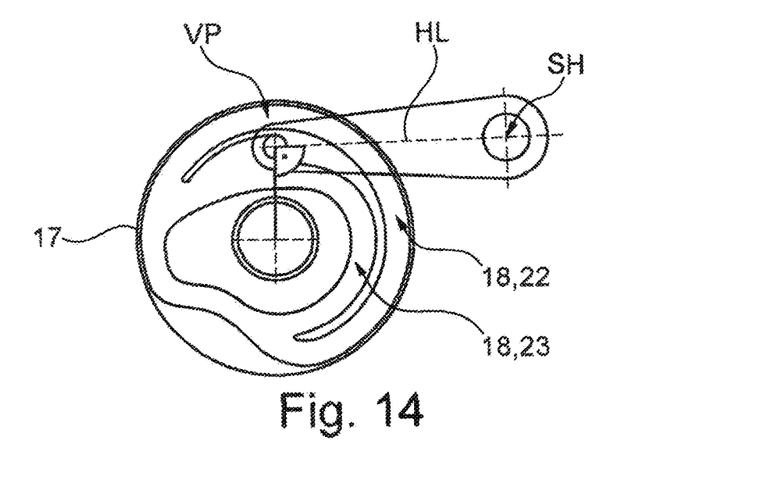

The latching position denoted by VP, as illustrated in FIG. 14, can be approached from that position of the locking unit 12 which is illustrated in FIG. 13, wherein, up to the corresponding switching point U3 which enables the latching position to be approached, the locking disk 17 is initially turned clockwise. A pivoting movement then takes place in the counterclockwise direction until the latching position VP is reached. As revealed in FIG. 14, in the latched position of the locking unit 12, a right angle is enclosed between a line drawn through the pivot axis SH and the center point of the end piece 19 and the lever longitudinal axis (denoted by HL) of the locking lever 16. Weight forces of the motor vehicle, which are introduced onto the actuator 1, have the effect of latching the locking unit 12. The described latching function is also produced in modified designs in which the said angle is not a right angle.

Figure 15:
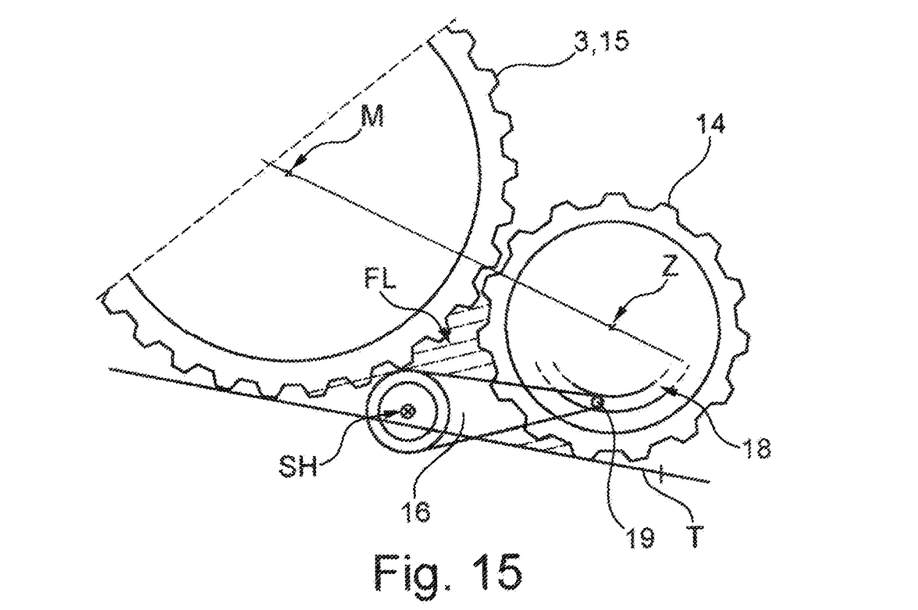

Geometrical features of the gear 11 of the actuator 1, which is formed by the driving toothed wheel 13, the intermediate wheel 14 and the main wheel 15, are explained below with reference to FIG. 15. In addition to the pivot axis SH of the locking lever 16, the center axis M of the spindle drive 2, which is identical to the rotational axis of the spindle nut 3, and the rotational axis (denoted by Z) of the intermediate wheel 14 are indicated herein. A straight line connecting the rotational axes M, Z encloses an acute angle with a tangent T which is placed at the main wheel 15 and at the intermediate wheel 14. A surface FL is enclosed between these tangents T and the two toothed wheels 13, 14, which surface lies in the plane of the drawing illustrated in FIG. 15 and is arranged normally to the rotational axes M, Z. The pivot axis SH, which is aligned parallel to the rotational axes M, Z, intersects the surface FL. The locking contour 18 is illustrated merely in outline in FIG. 15.

Figure 5:
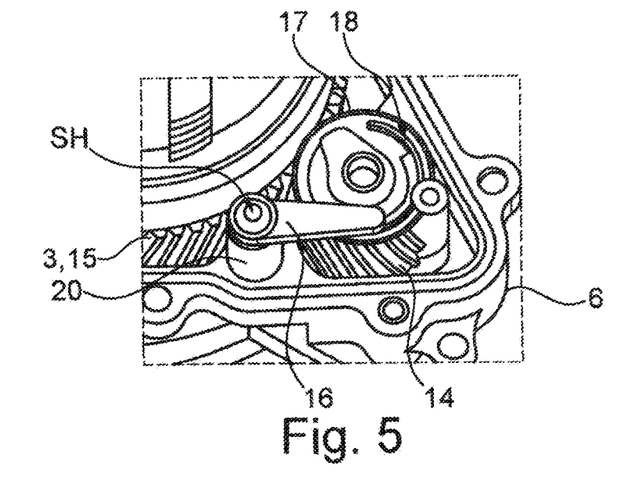
Figure 16:
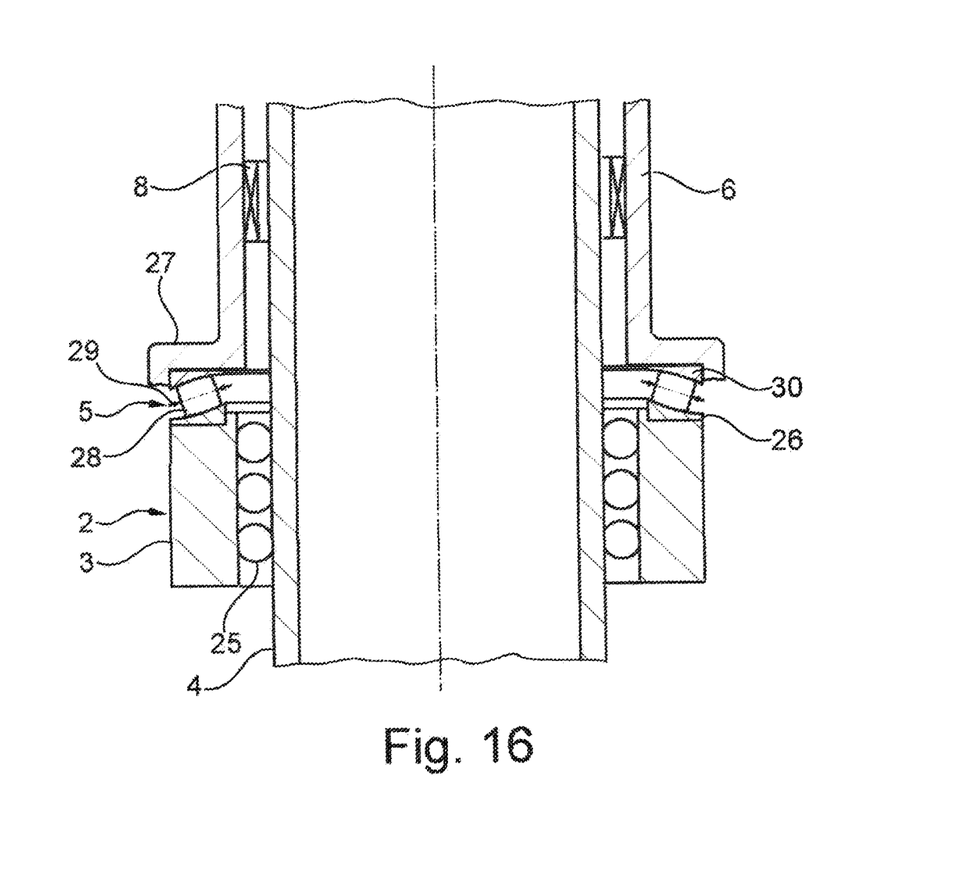

Features of the axial bearing 5 are shown in FIG. 16. In FIG. 5, rolling bodies 25, namely balls, of the spindle drive 2 can be seen. The axial bearing 5 arranged coaxially to the spindle drive 2 has a rotating disk 26 and a non-rotating supporting disk 30 which, to a limited extent, enables pivoting movements of the spindle nut 3 within the housing 6. The supporting disk 30 is inserted into a bearing holder 27 formed by the housing 6.

During operation of the spindle drive 2, the disk 26 rotates together with the spindle nut 3. Rolling bodies 28, namely rollers, rolling on the disk 26 are guided in a cage 29 and contact the supporting disk 30, which has the function of a housing disk of the axial bearing 5. The design of the axial bearing 5 as a self-aligning bearing, namely an axial self-aligning roller bearing, contributes significantly to the prevention of prestresses within the spindle drive 2.

Figure 11:
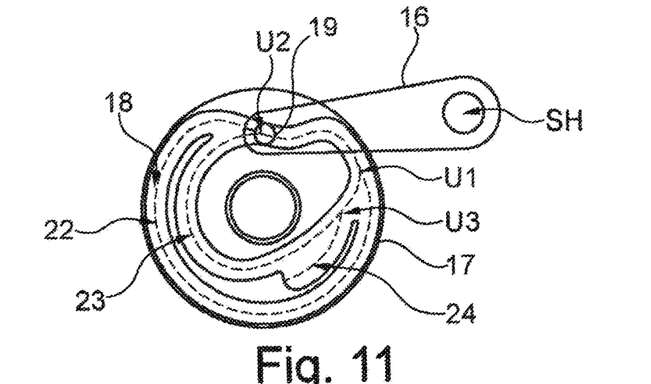
Figure 12:
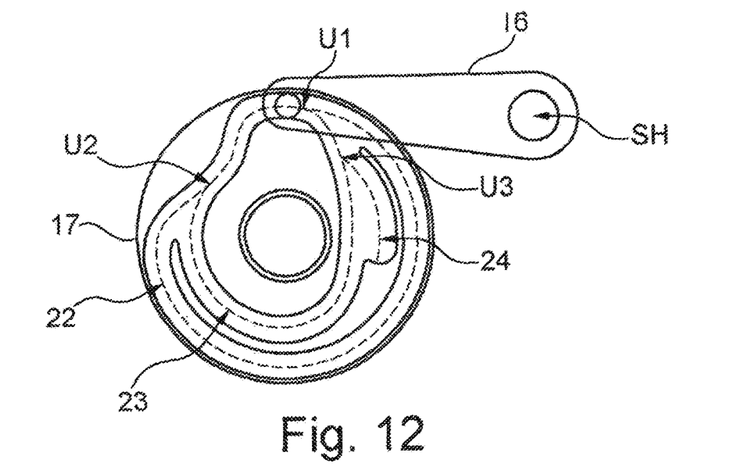
Figure 17:
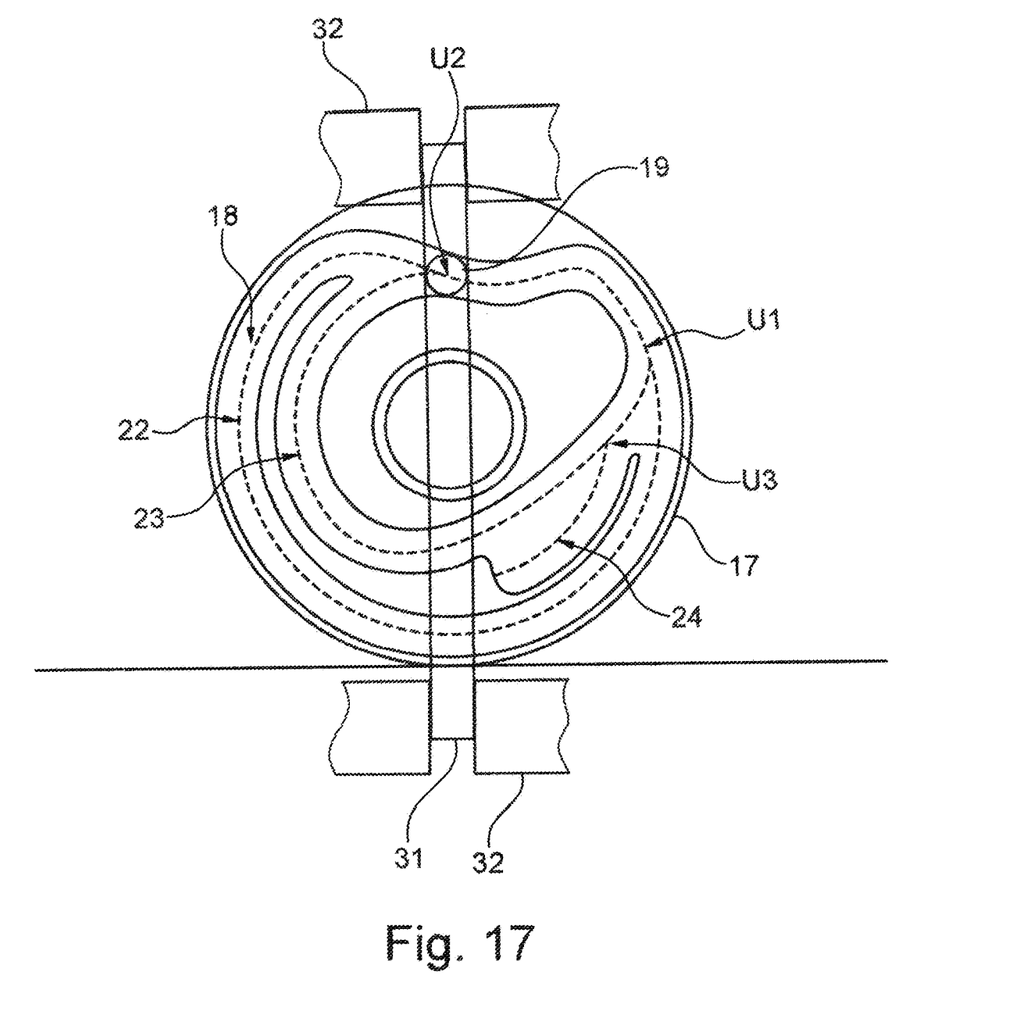

FIG. 17 shows, in a view analogous to FIG. 11, an alternative design of the locking unit 12. In this case, the locking element is constructed as a slide 31. The end piece 19 formed as a pin projects at a right angle from the remaining, linearly displaceable locking element 31 and, in direct cooperation with the locking contour 18, has the same function as the end piece 19 of all exemplary embodiments described above. An undercut is optionally realized via the engagement of the end piece 19 of the slide 31 in the locking contour 18, as already explained with reference to FIGS. 6 and 7.

The slide 31 is linearly slideably mounted in a slotted guide 32, which is fixedly connected to the housing 6, wherein the slideability is associated with a stiffness such that—in a manner which is, in principle, comparable to a pivotable locking lever 16—an alteration to the position of the slide 31 is only possible as a result of a twisting of the locking disk 17. As is essentially known in the case of linear guides, the cross-sections of the slide 17 and the slotted guide 32 are designed in such a way that it is not possible for the slide 31 to lift out of the slotted guide 32, i.e. out of the plane of the drawing according to FIG. 17. Therefore, a lifting of the slide 31 off the locking contour 18 is reliably prevented, even without an undercut on the end piece 19.

LIST OF REFERENCE SIGNS

1 Actuator
2 Spindle drive, ball screw
3 Spindle nut
4 Spindle
5 Axial bearing
6 Housing
7 Spring seat
8 Anti-twist device
9 Vehicle adaptor
10 Electric motor
11 Gear
12 Locking unit
13 Toothed wheel, evoloid
14 Intermediate wheel
15 Main wheel
16 Locking lever, locking element
17 Locking disk
18 Locking contour, control contour
19 End piece
20 Journal
21 Screw
22 Running contour 23 Running contour
24 Latching contour
25 Rolling body, ball
26 Disk
27 Bearing support
28 Rolling body, roller
29 Cage
30 Supporting disk
31 Slide, locking element
32 Slotted guide
FL Surface
HL Lever longitudinal axis
M Rotational axis
SH Pivot axis
T Tangent
U1 . . . U3 Switching point
VP Locking position
Z Rotational axis

The invention claimed is:

1. An actuator of a device for level adjustment of a motor vehicle, having a spindle drive, which is actuated by an electric motor via a gear and has a rotatable spindle nut which is coupled via an axial bearing to a housing which is slideable relative to a spindle in a manner secured against twisting, and having a locking unit, which is provided for optionally activating and deactivating a blocking of the spindle nut via the actuation of the electric motor, wherein the locking unit comprises a locking contour, which revolves upon a rotation of the spindle nut and is attached to an end face of an element of the gear, and a movable locking element which engages in the locking contour in the axial direction of the spindle drive, wherein the locking element is formed as a locking lever which can be deflected about a pivot axis parallel to the axis of the spindle drive, wherein the locking lever is loaded by a spring force parallel to the pivot axis.

2. The actuator as claimed in claim 1, wherein the locking element is loaded within the locking unit by holding forces sufficient to hold the locking unit in position in the absence of a pivoting movement of the locking contour.

3. The actuator as claimed in claim 1, wherein the locking element is formed as a slide, which is slideable in a plane parallel to the locking contour.

4. The actuator as claimed in claim 1, wherein the axial bearing is formed as an axial self-aligning bearing.

5. The actuator as claimed in claim 1, wherein the locking element is secured against lifting off the locking contour.

6. The actuator as claimed in claim 1, wherein the locking contour has a first annularly closed running contour, a second annularly closed running contour and a latching contour, wherein the two running contours have a common portion and the latching contour has at least one common point with at least one of the running contours.

7. The actuator as claimed in claim 1, wherein the gear is a spur gear.

8. The actuator as claimed in claim 7, wherein the gear is a multi-stage spur gear.

9. The actuator as claimed in claim 8, wherein a locking disk having the locking contour is connected to an intermediate wheel of the multi-stage spur gear in a torque-proof manner.

10. The actuator as claimed in claim 9, wherein the locking element is formed as a locking lever which can be deflected about a pivot axis parallel to the axis of the spindle drive and wherein a surface delimited by the spindle nut, the intermediate wheel and a tangent placed at the spindle nut and the intermediate wheel exists within a plane aligned normally to rotational axes of rotatable elements of the gear, which surface is intersected by the pivot axis of the locking lever.

11. An actuator comprising:
a spindle held against rotation;
a nut supported for rotation about the spindle such that rotation about the spindle causes the nut to move axially with respect to the spindle;
a first gear driveably connected to the nut, the gear defining a first annularly closed running contour, a second annularly closed running contour, and a latching contour, wherein the two running contours have a common portion and the latching contour has a common point with the first running contour; and
a locking unit supported to move in a plane perpendicular to an axis of the first gear, the locking unit engaging the contours of the first gear so as to follow the first running contour in response to rotation of the first gear in a first direction, follow the second running contour in response to rotation of the first gear in a second direction opposite to the first direction, and follow the latching contour in response to rotation of the first gear in the second direction starting from the common point, the locking unit configured to preclude further rotation in the second direction upon reaching an end of the latching contour.

12. The actuator of claim 11 further comprising a friction mechanism configured to resist movement of the locking unit.

13. The actuator of claim 11 further comprising:
a second gear fixedly coupled to the nut and meshing with the first gear; and
an electric motor drivably connected to the first gear.

14. A level adjustment apparatus for a motor vehicle, the apparatus comprising:
a spindle held against rotation with respect to the vehicle;
a nut supported for rotation about the spindle such that rotation about the spindle causes the nut to move axially with respect to the spindle to adjust a level of the vehicle;
a first gear driveably connected to the nut, the gear defining a first annularly closed running contour, a second annularly closed running contour, and a latching contour, wherein the two running contours have a common portion and the latching contour has a common point with the first running contour;
an electric motor driveably connected to the first gear; and
a locking unit supported to move in a plane perpendicular to an axis of the first gear, the locking unit engaging the contours of the first gear so as to follow the first running contour in response to rotation of the first gear in a first direction, follow the second running contour in response to rotation of the first gear in a second direction opposite to the first direction, and follow the latching contour in response to rotation of the first gear in the second direction starting from the common point, the locking unit configured to preclude further rotation in the second direction upon reaching an end of the latching contour.

15. The level adjustment apparatus of claim 14 further comprising a friction mechanism configured to resist movement of the locking unit.

16. The level adjustment apparatus of claim 14 further comprising:
a second gear fixedly coupled to the nut and meshing with the first gear; and a third gear fixedly coupled to the electric motor and meshing with the first gear.

\* \* \* \* \*